US009532225B2

(12) United States Patent
MacKenzie et al.

(10) Patent No.: US 9,532,225 B2
(45) Date of Patent: Dec. 27, 2016

(54) SECURE PAIRING OF END USER DEVICES WITH INSTRUMENTS

(71) Applicant: General Electric Company, Schenectady, NY (US)

(72) Inventors: Patricia Denise MacKenzie, Clifton Park, NY (US); Lennart Bjorkesten, Uppsala (SE); Shaopeng Liu, Niskayuna, NY (US); Viktor Holovashchenko, Niskayuna, NY (US); David Smith, Niskayuna, NY (US); Erik Nils Patrik Franzen, Uppsala (SE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/302,967

(22) Filed: Jun. 12, 2014

(65) Prior Publication Data

US 2015/0365512 A1    Dec. 17, 2015

(51) Int. Cl.
*H04W 12/08* (2009.01)
*H04L 29/06* (2006.01)
*G06F 21/44* (2013.01)

(52) U.S. Cl.
CPC ............ *H04W 12/08* (2013.01); *G06F 21/445* (2013.01); *H04L 63/104* (2013.01); *G06F 2221/2141* (2013.01)

(58) Field of Classification Search
CPC ................. H04W 12/08; G06F 21/445; G06F 2221/2141; H04L 63/104; H04M 1/72533
USPC . 455/420, 411; 725/25, 110; 726/4; 370/310
See application file for complete search history.

(56) References Cited

U.S. PATENT DOCUMENTS

| 6,772,331 | B1* | 8/2004 | Hind et al. ................... 713/151 |
|---|---|---|---|
| 8,103,247 | B2 | 1/2012 | Ananthanarayanan et al. |
| 8,472,874 | B2 | 6/2013 | Tang et al. |
| 8,533,475 | B2 | 9/2013 | Frikart et al. |
| 8,620,027 | B2 | 12/2013 | Tseng et al. |
| 2006/0083187 | A1* | 4/2006 | Dekel ........................ 370/310 |
| 2008/0195299 | A1* | 8/2008 | Barnicle et al. ............. 701/115 |
| 2008/0285626 | A1 | 11/2008 | Claus et al. |
| 2010/0112979 | A1* | 5/2010 | Chen et al. ................... 455/411 |
| 2011/0069184 | A1* | 3/2011 | Go ............................ 348/207.1 |
| 2012/0096503 | A1* | 4/2012 | Slothouber et al. ......... 725/110 |
| 2012/0221634 | A1 | 8/2012 | Treu et al. |
| 2013/0007208 | A1 | 1/2013 | Tsui et al. |
| 2013/0218731 | A1 | 8/2013 | Elson et al. |
| 2013/0225081 | A1 | 8/2013 | Doss et al. |
| 2013/0246637 | A1 | 9/2013 | Garcia Jurado Suarez et al. |
| 2013/0295913 | A1* | 11/2013 | Matthews et al. ........... 455/420 |

(Continued)

*Primary Examiner* — Nathan Taylor
(74) *Attorney, Agent, or Firm* — Buckley, Maschoff & Talwalkar LLC (57) ABSTRACT

A role-based access control method and/or system permits end users to securely pair their mobile devices via a pairing apparatus with one or more instruments to, for example, remotely monitor operations of the instruments. In an embodiment, the process includes a pairing apparatus receiving a pairing request from an instrument including a unique access code, and receiving a pairing request from an end user mobile device that includes an end user mobile device identifier and an access code. If the unique access code matches the end user's access code, then the end user mobile device identifier is added to a security group and a successful pairing message is transmitted to at least one of the instrument and the end user mobile device.

23 Claims, 4 Drawing Sheets

(56) References Cited

U.S. PATENT DOCUMENTS

2014/0165090 A1\* 6/2014 Andreasen et al. ............ 725/25
2014/0181916 A1\* 6/2014 Koo et al. ......................... 726/4

\* cited by examiner

SECURE PAIRING OF END USER DEVICES WITH INSTRUMENTS

BACKGROUND

In general, some embodiments relate to cloud computing and more specifically to pairing mobile end user devices with remote instruments via the cloud. In particular, a role-based access control method and/or system is utilized that permits an end user to securely pair his or her mobile device via a pairing apparatus (such as the cloud or a server computer) with an instrument in order to, for example, remotely monitor the status and/or condition of that instrument.

Conventional pairing technologies utilize administrative-based systems. In such systems, a central administrator is responsible for adding users, adding instruments, and for matching users and instruments. Some other types of pairing systems require physical proximity and/or direct communications between the user's mobile device and the instrument. In addition, some implementations of pairing systems require linking between a user device and an instrument to occur during manufacture or set-up of the user device and/or instrument.

The present inventors recognized opportunities for providing simple, secure methods and systems for pairing user mobile devices with instruments without requiring an administrator, and without requiring mobile devices and instruments to be in physical proximity to each other.

BRIEF DESCRIPTION

In some embodiments, a computer-implemented method includes receiving a pairing request from an instrument including a unique access code, and then receiving a pairing request from an end user mobile device that includes an end user mobile device identifier and an access code. The process includes determining that the unique access code from the instrument matches the access code from the end user mobile device, adding the end user mobile device identifier to a security group, and then transmitting a successful pairing message to at least one of the instrument and the end user mobile device. The end user mobile device is then paired to the instrument and the end user can then, for example, remotely monitor the operation of the instrument via his or her mobile device.

In some embodiments, the computer-implemented method may also include, after receiving the pairing request from the instrument, determining that a predetermined time interval expired without receiving a pairing request from an end user mobile device concerning the instrument. When this occurs, a failure message is transmitted to the instrument, and in some implementations of the computer-implemented method the unique access code is deleted.

In some embodiments, an apparatus includes a processor and a memory in communication with the processor. The memory stores program instructions, and the processor is operative with the program instructions to perform functions as set forth in the preceding paragraphs.

DETAILED DESCRIPTION

Systems and processes disclosed herein generally relate to cloud computing and more specifically to the secure pairing of mobile end user devices with remote instruments. In particular, some embodiments utilize cloud computing systems and role-based access and control methods to permit an end user to securely pair his or her mobile device (such as a mobile telephone, tablet computer, or personal digital assistant (PDA)) via the cloud with a remote instrument (such as a medical instrument, engine sensor, or oil pump). However, embodiments are contemplated wherein an end user can utilize a pairing server computer or remote server computer to securely pair his or her mobile device with an instrument.

Once paired, in some implementations the end user can then utilize his or her mobile device to monitor the status and/or the condition of the remote instrument as well as monitor the status and/or view results, for example, of an experiment. In addition, in some embodiments the end user may be able to utilize his or her mobile device to monitor usage of a remote instrument, and/or to receive remote alerts regarding, for example, instrument errors, and/or to receive notification of unused modules, and/or to set up customized alerts regarding one or more remote instruments. Additional applications may include, in some embodiments, remote command of instruments via a paired end user mobile device. Remote command capability may include the ability to initialize operation of the paired instrument, adjust operating parameters, adjust run time of the instrument, and the like to improve results. In addition, service data may be received concerning a paired instrument, which may be used to, for example, manage instrument maintenance and/or instrument supplies. Such remote monitoring and/or remote control of the instrument may also enhance collaboration between, for example, employees of a company.

In another example, a field service personnel can employ the end user mobile device to communicate with various remote instruments to more efficiently service equipment. For example, after pairing his or her end user mobile device with a land based turbine engine, a technician can review measurement data of a plurality of turbine engine sensors while also assessing dynamic and environmental operating conditions that may require changes to one or more operating parameters. In yet another example, the technician's end user mobile device may be paired to an instrument that is a member of a security group which includes a plurality of remote instruments, and due to that pairing the technician may utilize his or her end user mobile device to to monitor and/or assess and/or remotely control one or more of the instruments of that security group.

Accordingly, the present application is directed to various different types of end user mobile devices having communications capabilities (which may be wired or wireless). The end user mobile devices may include, but are not limited to, mobile telephones, personal digital assistants (PDAs), digital music players, laptop computers, tablet computers, and the like. Computing hardware and/or communications hardware and/or interfaces of the mobile devices allow various geographically dispersed end users to obtain data from cloud-resident or cloud-connected application programs. The mobile devices may employ one or more different types of communications components operable to connect with mobile-phone carriers, and/or with Wi-Fi providers, and/or with other communication services providers. A cloud provider may contract with wireless carriers, Wi-Fi providers, and/or with other communications-services providers to provide for wireless and/or wired connections to the cloud-connected devices. Therefore, the cloud-computing facilities can execute application programs with which the mobile devices of geographically remote and/or dispersed end users can exchange data. A simple, well-designed mobile device application program can thus enable end users to utilize various different types of mobile devices to access one or more cloud-computing services applications from geographically dispersed locations for which traditional wireless-service subscriptions would not be economically feasible.

Figure 1:
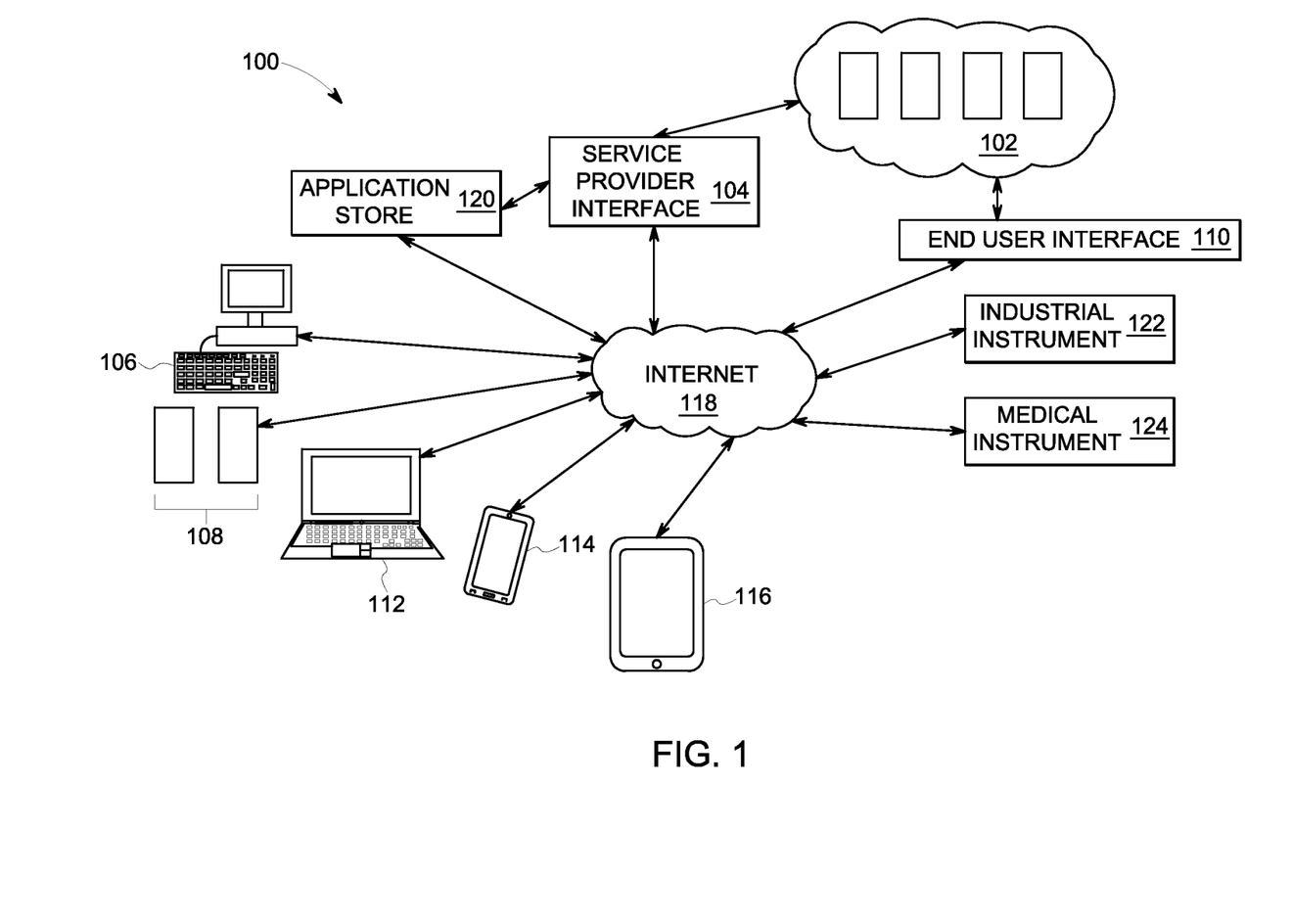
FIG. 1 is a block diagram of an example of a pairing computer system for providing pairing services in accordance with disclosed embodiments.

FIG. 1 is a block diagram of an example of a cloud computing system 100 for providing pairing services in accordance with some embodiments. The cloud computing system may include various interfaces to cloud-computing facilities maintained by a cloud provider and managed on behalf of users of the cloud-computing services. In some embodiments, the cloud 102 includes a large numbers of computers, data-storage systems, and communications facilities. Since the cloud provider manages and maintains the physical computing, data-storage, and communications hardware, cloud-computing users are not required to pay for the equipment costs, maintenance, and management overheads associated with purchasing, managing, and maintaining data centers. In addition, cloud computing users can contract to use only those computing services needed on an as-needed basis. Otherwise, the end users would need to purchase, manage, and maintain sufficient computing and communications facilities to handle peak loads and demands, much of which could be idle during nonpeak-demand operations. Thus, the use of cloud computing services has been widely adopted by many different businesses of all sizes. For example, some merchants deploy Internet-based services on cloud-computing facilities, which allow the merchants to closely tailor their use of the cloud computing services to real-time customer demand for the merchant's products and/or services.

It should be understood, however, that a cloud computing system need not be utilized in order to utilize the novel processes disclosed herein that permit end users to easily and securely pair their mobile devices (such as mobile telephones) with one or more instruments (such as a medical devices, industrial instruments and the like). Thus, for example, a remote server computer may be configured to perform the pairing. Such a server computer may be owned and/or operated by a company for use by its employees, for example, or may be operated by a third party service provider. A pairing system utilizing a pairing server computer may also be scalable to include additional remote pairing server computers, for example, in order to accommodate an increase in users and/or an increase in the number of instruments.

Referring again to FIG. 1, a cloud provider of the cloud computing system 100 may provide a plurality of different interfaces to the cloud computing services. For example, different types of interfaces may be provided that allow cloud computing clients to launch virtual machines, application programs, and/or other computational entities on the cloud 102. Thus, a service provider interface 104 may be provided for use by service provider clients 106 and 108, and an end user interface 110 may include Internet protocol ports that enable mobile device end users 112, 114 and 116 of the service providers 106 and 108 to access, via the Internet 118, the services provided by the service provider clients resident on the cloud 102. For example, a service provider client of the cloud may deploy web servers on the cloud computing facilities that conduct commercial transactions and/or distribute information to users who access service provider websites via the Internet 118.

In some embodiments, a service provider client of the cloud may utilize and/or be associated with an application store 120 from which end users 112 to 116 may obtain or download one or more application programs for use with their mobile devices, which application programs are operable to access desired services resident in the cloud 102. Also shown in FIG. 1 are two examples of industrial devices, an industrial instrument 122 and a medical instrument 124 that are connected to the cloud 102 via the Internet 118. In embodiments described herein, such instruments may be paired to one or more of the user mobile devices 112, 114 and/or 116 in accordance with processes disclosed herein. In general, the service providers and end users access the Internet 118 through Internet service providers ("ISPs") and/or other communications-services providers (not shown), which access may be provided on a subscription or monthly-fee basis.

Some businesses have a need to provide employees in diverse geographic locations with real-time data from instruments that are, for example, running tests or otherwise are in operation. For example, a Life Sciences division of a company may employ engineers and/or researchers and/or scientists and/or doctors (who may all be considered "end users") who need to be able to pair their mobile devices with specific industrial instruments such as medical test instruments so they can have remote access to data from those instruments. A simple, secure method for an end user to pair his or her mobile device with a specific, remotely located instrument is therefore disclosed herein. In some embodiments, the pairing process combines a non-traditional use of pairing technology with role-based access control (and/or rules-based access control) via the cloud or via a server computer. The processes disclosed herein provide features that are utilized by the end users, which include that no administrator is required, that physical proximity is not required, and that the pairing method is simple, secure and revocable. The pairing processes disclosed herein also provide key features that are required by companies and/or other entities that own and/or operate industrial instruments including, but not limited to, ensuring that only authorized persons can securely pair their mobile devices to company instruments and having the ability to revoke authorization.

Referring again to FIG. 1, processes described herein enable an end user to pair his or her mobile device, such as mobile device 114, with a specific instrument, such as industrial instrument 122 via the cloud 102. Once paired, the user can use his or her mobile device 114 to remotely monitor the status and/or condition of the industrial instrument 122 and/or the function(s) being performed by the industrial instrument. In some embodiments, before pairing may occur the end user must first establish an account in the cloud 102. Thus, some organizations or businesses may require employees to establish an account in an "industrial cloud" (which may be provided and managed by the organization), or in a secure cloud managed and/or maintained by a third party. As mentioned earlier, instead of a cloud-based system, a server computer may be utilized to enroll or to register end users (establish a pairing account) and then to conduct the pairing.

In some embodiments, rules may be developed and enforced in the cloud to control or govern end users, and/or end user mobile devices, and/or instruments that can utilize the system for pairing. For example, a rule may require an end user to establish an end user pairing account by utilizing an employee login account (for example, an end user may be required to register for a pairing account by using his or her company e-mail account, which may serve to confirm that the end user is an employee of the company). Similarly, a rule may be enforced that requires each instrument capable of being paired with end user mobile devices to first be registered. For example, instrument registration may require an information services employee of the company to use an input device (such as a touch screen) associated with or operably connected to the instrument to access an instrument registration application that is either in the cloud (or in a pairing server computer) or that was downloaded from, for example, an application store. The instrument registration application may require input of a unique identifier or identifiers (such as an instrument model number and/or an instrument serial number) that uniquely identifies the instrument to the pairing apparatus (such as to the cloud or to a pairing server computer). In addition, in some embodiments, instruments may control remote access by enforcing instrument-level rules that restrict pairing requests, for example, to persons having an employee identification number or employee email address. The instrument-level rules may include additional limitations, for example, that restrict pairing privileges to only those employees on a list of persons identified by a company as needing remote access to particular instruments. Such measures may be implemented at the discretion of the company, for example, to provide heightened levels of security if required.

In some implementations, instrument monitoring application programs are provided and maintained that operate to, for example, monitor the status of each registered instrument, and to transmit instrument data to the cloud (or to a pairing server computer) when that instrument is in operation. Such data can then be accessed by end user mobile devices that have been paired with the instrument. Furthermore, one or more application programs are provided to create a security group of registered end users associated with each registered instrument because the security group allows for role-based control (as explained below). In addition, in some embodiments instrument control application programs may be provided that enable an end user mobile device that has been paired with an instrument to control some or all of the operations of that instrument.

In some embodiments, for an end user to pair his or her mobile device with a particular instrument, the end user must initially make a request for that instrument to add a remote user. In the case where the end user has physical access to the instrument, then he or she can utilize an input device of the instrument (such as a keypad or a touchscreen) to access an end user registration application program. The end user registration application program causes the instrument to generate a "unique" code or unique access code which may be generated, for example, by use of a random number generator for providing a number which may then be hashed with all of, or a portion of, an instrument serial number or some other number to result in the unique access code. The instrument displays that unique access code on a display device, and transmits the unique access code to the pairing apparatus (for example, to the cloud or to a pairing server computer) for use in the pairing process.

In some embodiments, an error handling program is used to ensure that the generated unique access code is actually unique, so that if another instrument generates the same unique access code simultaneously or substantially simultaneously (which means that the access code is not unique), it will be rejected. Checking that the generated unique access code generated by any particular instrument is unique is important because at any given point in time there can be many instruments (of the same or different types) generating and then transmitting "unique" access codes to the pairing apparatus (such as the cloud) along with many different types of end user devices making pairing requests that could originate from many different places or locations at the same time or substantially the same time. Thus, when a pairing device receives an access code from an end user device, it checks that access code against any and all of the unique access codes received from instruments to see if there is a match.

In some implementations, the instrument next polls the pairing apparatus (for example, the cloud or a pairing server computer) at periodic intervals for a predetermined time for any requests for access that includes the access code. For example, the instrument may poll the pairing apparatus every fifteen seconds for five minutes (but other polling intervals and/or time limit durations may be utilized, which can be determined by a company or other entity) after which time the access code expires. Thus, continuing with this example, in order to pair his or her mobile device with the instrument, the end user must enter the unique access code into a remote user registration application running on his or her mobile device within the five minute duration time frame. The mobile device then transmits an access request to the pairing apparatus that includes the unique access code. When this occurs, the pairing apparatus responds to the latest polling request from the instrument with a "yes" message indicating that an end user requested access and provided the access code, and the instrument can then accept or reject the end user access request. For example, the instrument may be operating in accordance with company rules that deny access to end users who used certain types of email addresses or who do not have an appropriate employee designation and/or are have not yet attained a particular senior employee level.

In the case wherein the instrument accepts the end user pairing request, the instrument then transmits an accept message to the pairing apparatus. The instrument and/or the pairing apparatus then enters an identifier for the remote end user mobile device in a security group for that instrument. The remote end user mobile device and the instrument are then paired, the access code is no longer held in the pairing apparatus (the pairing apparatus deletes that access code), and the remote end user mobile device receives a notification from the pairing apparatus that it has been successfully paired with the instrument. At this point the end user can use his or her mobile device to receive updates and/or data from the instrument regarding, for example, instrument status, instrument functions, experiment data and/or results data. Since the end user receives such data in real-time or near real-time as the instrument is operating, improved productivity, asset management, and progress monitoring may result.

In the case where the end user is located in a remote location away from the instrument, then the end user may communicate with a fellow employee (for example, via cell phone) and request that he or she be added to a list of authorized remote end users. The fellow employee, who has access to the instrument, may then utilize an input device of the instrument (such as a keypad or a touchscreen) to access the registration application program to add the remote end user. As explained above, the user registration application program then causes the instrument to generate a unique access code by, for example, using a random number generator to produce a number that is hashed with a serial number or some other number. As also mentioned earlier, an error handling program may be used to ensure that the generated access code is unique, so that if another instrument generates the same access code simultaneously, it will be rejected.

Continuing with the above example, the instrument next displays the unique access code on a display device and also transmits that access code to the pairing apparatus (such as the cloud). The fellow employee reads the access code and communicates it to the requesting person (the remote end user), for example, via email, text message, or via a cell phone call. The instrument then starts polling the pairing apparatus at periodic intervals, such as every thirty seconds for a ten minute duration, for any requests to access it that include the unique access code. If there has been no indication of receipt by the pairing apparatus of an access request that includes that unique access code within the ten minutes duration, then the end user registration process is terminated and the instrument cancels the access code. However, if the remote end user enters the unique access code into a remote user registration application on his or her mobile device, and the mobile device transmits an access request to the cloud with the unique access code before the ten minute duration expires, then in response to the next polling request from the instrument the pairing apparatus will respond with a "yes" message to the instrument which indicates that the remote user is requesting access. As explained earlier, in some embodiments the instrument can then accept or reject the remote user access request depending on company and/or business rules residing on the instrument. Such company and/or business rules may be provided by the company and/or the entity that owns and/or operates the instrument to restrict access to remote users who qualify, for example, only to remote end users who are associated with company email addresses.

If the remote user access request is accepted, then the instrument transmits an accept message to the pairing apparatus and the pairing apparatus then enters an identifier for the remote end user mobile device in a security group for that instrument. The remote end user mobile device and the instrument are then paired, and the access code is no longer held in the pairing apparatus. The remote end user mobile device next receives a notification from the pairing apparatus that it has been successfully paired with the instrument. At this point the remote end user can receive updates and/or data from the instrument regarding, for example, instrument status, instrument functions, experiment data and/or results data. As mentioned above, receiving such data in real-time or near real-time as the instrument is operating may result in improved remote end user productivity, improved asset management, and improved progress monitoring.

In some embodiments, when an end user mobile device is paired with a particular instrument it is also paired to other instruments that are associated with a particular security group. For example, an end user mobile device that is paired to a first medical instrument in a lab facility may also be provided with access to data from other medical instruments in the same lab facility. Thus, the pairing of the end user mobile device to one instrument may result in pairing that includes multiple machines or instruments associated with a particular security group (or gateway). In addition, if a new instrument or a new machine is added to that security group, then each of the end user mobile devices that are members of that security group may be automatically paired with the new instrument. Such an automatic process eliminates the need for an administrator to provide such functionality, along with eliminating the associated costs, training requirements and ongoing maintenance.

Figure 2:
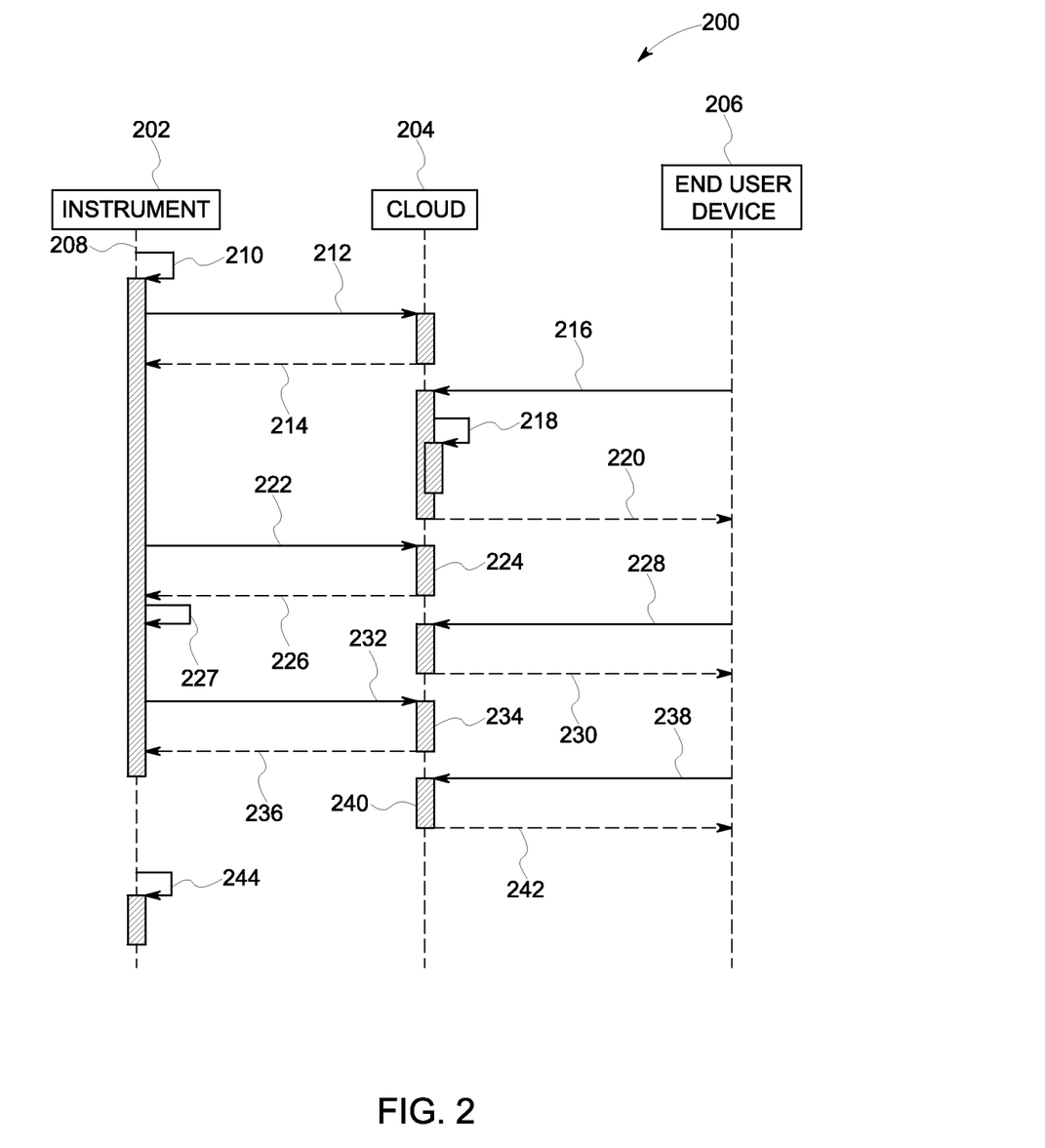
FIG. 2 illustrates a sequence diagram for pairing a remote user device with an instrument according to some embodiments.

FIG. 2 illustrates an example of a sequence diagram 200 for pairing an end user device with an instrument according to some embodiments. The instrument 202 includes a pairing application, the pairing apparatus or cloud 204 includes cloud software, and the end user's mobile device 206 includes a pairing application. In some implementations, the instrument and/or the pairing apparatus also includes rules for permitting and/or denying pairing access to end users (as explained herein).

Referring to FIG. 2, the process begins when an instrument operator requests 208 the addition of a remote end user and the instrument pairing software generates and displays 210 a unique code which is an access code. The instrument then transmits 212 a web services call with the access code to check if a request for pairing with an end user device that included the access code was made. The cloud 204 initially transmits 214 a failure message because the end user has not yet made such a pairing request. Next, the cloud receives 216 a pairing request from the end user's mobile device to pair with that instrument that includes the unique access code. The cloud software then checks 218 to see if a request for pairing was received from the instrument that included the unique access code and finds that it was, so a confirmation message is transmitted 220 to the end user mobile device indicating that the access code is correct.

Referring again to FIG. 2, the instrument pairing application again polls 222 the cloud 204 to see if a pairing request with the unique access code has been received by the cloud. The cloud confirms 224 that such a pairing request with the access code was received from the end user's mobile device and thus transmits 226 a success message indicating that such a request was received, wherein the success message includes pairing request data from the end user's mobile device. At this point, in some embodiments the instrument 202 uses one or more rules to determine 227 based on the pairing request data (which may include end user identification data such as an end user company email address) that the end user is acceptable before generating an accept pairing message. (In some implementations, the pairing apparatus (such as the cloud) determines whether or not the end user mobile device may be paired based on rules resident on the pairing apparatus.) At this time, the cloud also receives 228 an accept message from the end user's mobile device to accept the pairing, and transmits 230 a pending message to the mobile device.

Since the instrument 202 determined 227 that the end user is acceptable, the cloud receives 232 an accept pairing request from the instrument and then adds 234 the end user's mobile device into a Security Group resident on the cloud of registered and/or approved users for that instrument. The result is that the end user's mobile device is now paired with the instrument. The cloud then transmits 236 a successful pairing message to the instrument, and receives 238 another accept message from the end user's mobile device to accept pairing. The cloud then confirms 240 that the end user's mobile device is present in the Security Group of approved users for that instrument, and then transmits 242 a successful pairing message to the end user's mobile device. In some embodiments, the instrument software also operates to display 244 an end user mobile device account connected (or paired) confirmation dialog box on a display screen of the instrument.

Figure 3:
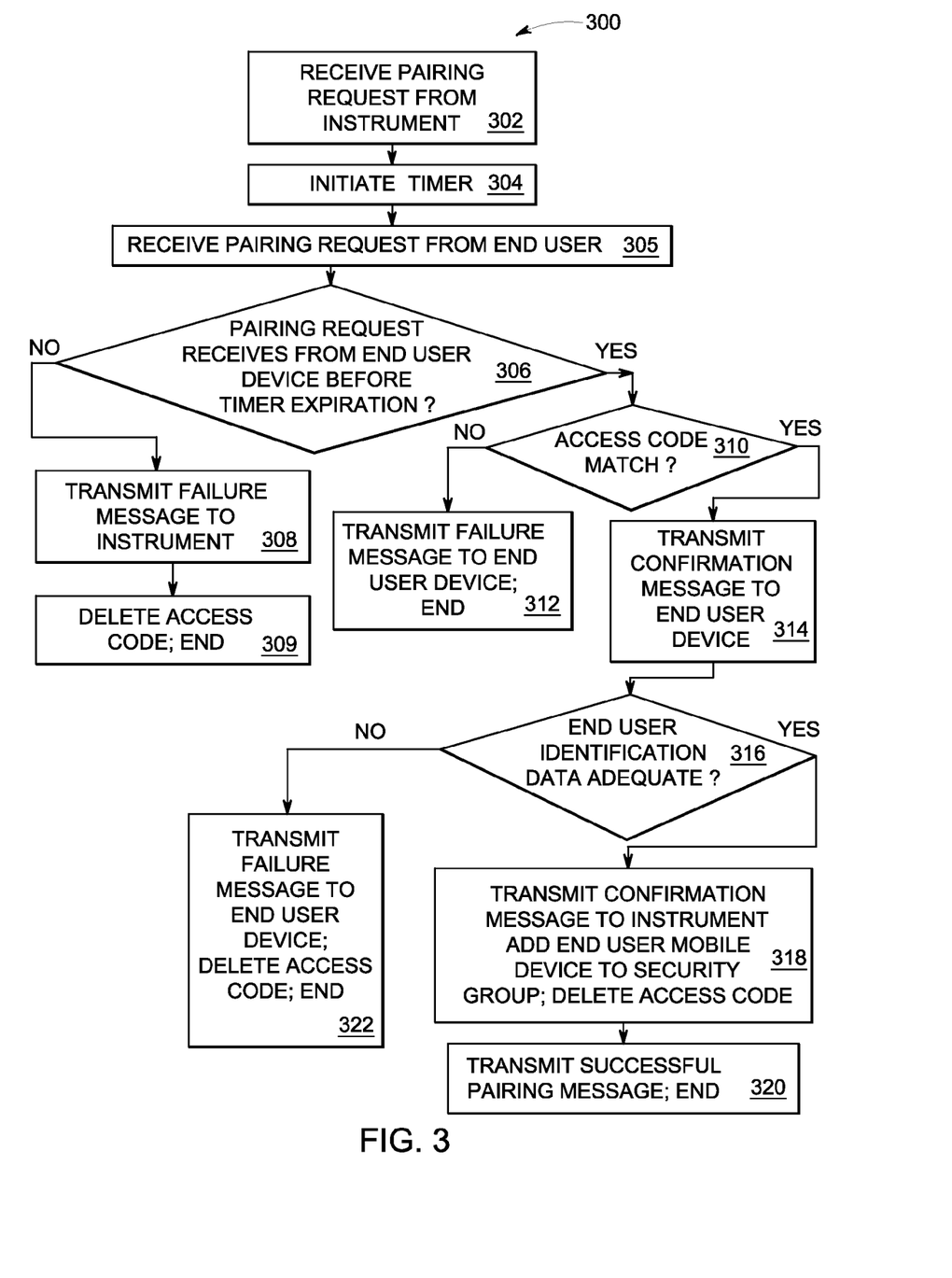
FIG. 3 is a flowchart of a method for pairing an end user's mobile device with a remote instrument via a pairing apparatus according to some embodiments.

FIG. 3 is a flowchart 300 of a pairing process for pairing an end user's mobile device with a remote instrument according to some embodiments. The process begins when the pairing apparatus (such as a server computer or the cloud) receives 302 a pairing request from an instrument, which pairing request includes a unique access code. The pairing apparatus then initiates 304 a timer which is preset to expire after a predetermined amount of time, and which governs how often the pairing apparatus checks for any pairing requests for the instrument that include the unique access code. For example, the timer may be configured to cause the pairing apparatus to check for the unique access code every fifteen seconds for five minutes starting from when the pairing request was first received from the instrument. Next, a pairing request is received 305 from an end user mobile device regarding the instrument, which pairing request includes an access code and user identification data. The pairing apparatus then determines 306 whether the end user pairing request was received within the specified time frame (before the timer expires). If no such pairing request is received before the timer expires, then the pairing apparatus transmits 308 a failure message to the instrument, deletes 309 that unique access code, and the process ends. However, if a pairing request for the instrument is received 306 from an end user device within the predetermined time period (before timer expiration), then the pairing apparatus checks 310 to determine if the unique access code received from the instrument matches the access code received from the end user device. If not, then the pairing apparatus transmits 312 a failure message to the end user device, and the process ends.

However, if the instrument and end user device access codes match in step 310, then a confirmation message is transmitted 314 to the end user mobile device indicating that the access code is correct. Next, the pairing apparatus determines 316 whether or not the end user identification data satisfies one or more rules resident on the pairing apparatus, which rules may be provided by the entity or company that owns the instrument for security purposes. If the end user identification data is not adequate (for example, the end user identification data lacks a required element), then the pairing apparatus transmits 322 a failure message to the end user device, deletes the unique access code and the process ends.

But if in step 316 the end user identification data satisfies the rule(s), then the pairing apparatus transmits 318 a pairing request confirmation message to the instrument indicating that a pairing request was received and was authorized. The pairing apparatus also adds the end user's mobile device into a Security Group which may be resident (or stored) on the pairing apparatus (which lists registered and/or approved users for that instrument and/or group of instruments). In addition, the pairing apparatus deletes 318 the access code so that it cannot be utilized again in the future (for example, if in the future the end user's mobile device is deleted from the Security Group by the company). The end user's mobile device is now paired with the instrument, and thus the pairing apparatus transmits 320 a successful pairing message to the instrument and to the end user's mobile device, and the pairing process ends. The mobile device is communicatively connected to the instrument(s) and according to certain embodiments, configured to receive information, request information, and/or modify instrument parameters or processes.

Referring again to FIG. 3, if in step 306 the pairing acceptance message is not received from the end user's mobile device within a predetermined amount of time, then as explained earlier, the pairing apparatus transmits 308 a failure message to the instrument and deletes 309 the access code. Thus, if in the future a second end user submits a pairing request to the pairing apparatus and the original end user attempts to pair to the instrument using the old access code, there will be not match in step 310 and a failure message will be transmitted 312 to the original end user's mobile device. In such situations, the original end user may again attempt to pair his or her mobile device with the instrument by restarting the process to obtain a fresh unique access code from the instrument, and then proceeding in the same manner.

The flow diagrams and/or flowcharts and descriptions thereof herein should not be understood to prescribe a fixed order of performing the method steps described therein. Rather, the method steps may be performed in any order that is practicable. In addition, the flow charts described herein should not be understood to require that all steps or elements be practiced in every embodiment. For example, one or more elements or steps may be omitted in some embodiments.

Figure 4:
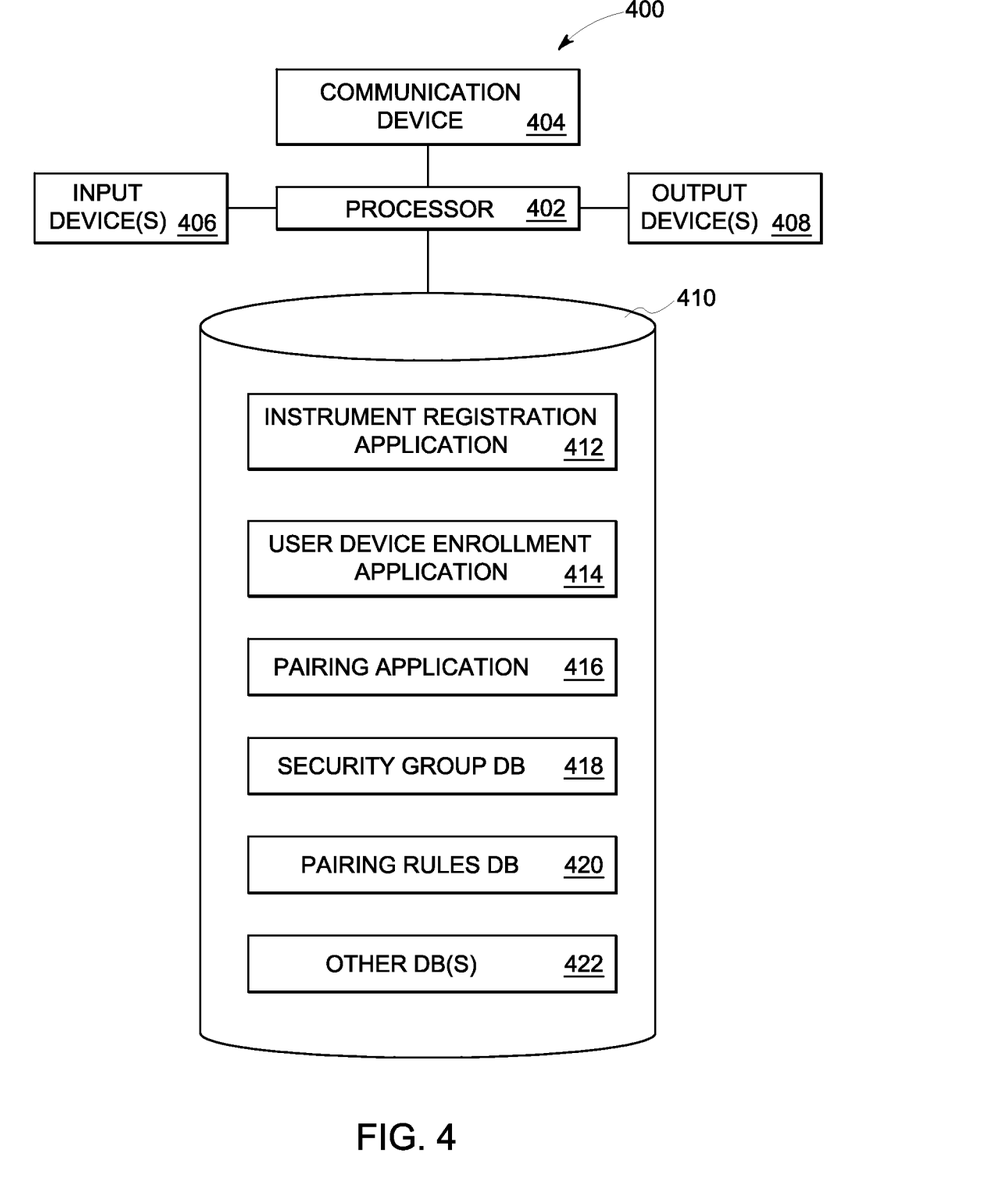
FIG. 4 is a block diagram of a pairing server computer for processing pairing requests to pair user mobile devices with instruments according to some embodiments.

FIG. 4 is a block diagram of a pairing server computer 400 for processing pairing requests to pair end user mobile devices with instruments according to some embodiments. The pairing server computer 400 may be owned and/or operated by a business organization which also owns the instruments which are to be paired, or may be owned and/or operated by a third party (such as a third party cloud provider) that contracted with the business organization to provide pairing services. The pairing server computer 400 may be conventional in its hardware aspects but may be controlled by software to cause it to operate in accordance with aspects of the methods presented herein. In particular, the pairing server computer 400 may include a computer processor 402 operatively coupled to a communication device 404, one or more input devices 406, one or more output devices 408, and a non-transitory storage device 410.

The computer processor 402 may constitute one or more conventional processors manufactured by companies such as Intel Corporation and the like. Processor 402 operates to execute processor-executable steps, contained in program instructions described herein, so as to control the cloud server computer 400 to provide desired functionality.

Communication device 404 may be used to facilitate communication with, for example, other devices (such as server provider interface components and/or user interface components for receiving pairing requests from instruments and end user devices, and for transmitting messages). Communication device 404 may also, for example, have capabilities for engaging in data communications over conventional computer-to-computer data networks, including the Internet, in a wired or wireless manner. Such data communications may be in digital form and/or in analog form.

Input device 406 may comprise one or more of any type of peripheral device typically used to input data into a computer. For example, the input device 406 may include a keyboard and a mouse and/or a touchpad that may be used, for example, by a systems engineer or other personnel authorized to, for example, perform cloud server computer system maintenance or other tasks. The output device 408 may comprise, for example, conventional output components such as a display and/or a printer.

The non-transitory storage device 410 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as flash memory devices. Any one or more of the listed storage devices may be referred to as a "computer readable medium", "memory", "storage", or "storage medium". The non-transitory storage device 410 stores one or more programs for controlling processor 402. The programs comprise program instructions that contain processor-executable process steps of the cloud server computer 400, including, in some cases, process steps that constitute processes provided in accordance with principles of the processes presented herein.

The programs may include an instrument registration application 412 that manages a process wherein instruments that may be paired to end user devices are registered with the pairing server computer. Similarly, the programs may include a user device enrollment application 414 that manages a process wherein end users create accounts so that they can pair their mobile devices to the instruments via the pairing server computer.

The non-transitory storage device 410 also stores a pairing application 416 configured for pairing an enrolled end user's mobile device to an instrument in accordance with processes disclosed herein. The pairing application is operable to receive pairing requests that include an access code from both an instrument and from an end user mobile device, to determine whether or not the access codes match, to transmit successful matching messages (or failure messages) to both the instrument and to the end user mobile device, and to add an end user mobile device that has been successfully paired into a Security Group associated with the instrument.

The storage device 410 may also include one or more databases, such as a Security Group database 418, which stores data indicative of end user mobile devices that have been paired to one or more instruments. In addition, a pairing rules database 420 may also be included that stores the pairing rules. The pairing rules, for example, may govern the enrollment of end users and/or end user devices, and/or may govern which type or types of instruments are eligible for pairing. The pairing rules may also include restrictions on the duration of pairing and/or on the time of day of pairing, and the like. Other rules and/or policies applicable to pairing end user mobile devices and instruments may also be included. Such paring rules and/or policies may be determined or set by the company or entity that owns and/or operates the instrument for which pairing can occur. In addition, other databases 422 may be maintained by the pairing server computer 400 on the storage device 410.

The application programs of the pairing server computer 400, as described above, may be combined in some embodiments, as convenient, into one, two or more application programs. Moreover, the storage device 410 may store other programs or applications, such as one or more operating systems, device drivers, database management software, web hosting software, and the like.

The systems and methods disclosed herein permit pairing of an end user mobile device and an instrument via a pairing apparatus, such as a remote server computer and/or the cloud. A unique access code generated by the instrument to initiate pairing is human-readable, and thus can easily be utilized by an end user to pair his or her mobile device with the instrument. In addition, the human readable unique access code advantageously permits an end user device in a remote location from the instrument to still be able to pair with it by having someone (such as a co-worker) who is at the instrument read the access code generated by the instrument to the end user, for example, over the telephone. Thus, all that is required is that someone (such as a fellow employee) be at the instrument to obtain the instrument-generated unique access code and to communicate that access code to the end user in any manner (for example, via a cell phone call, via a text message, or via email). A technical effect is that security is inherent in such a procedure, as the end user must either be in physical proximity to the instrument to be able to read the instrument-generated access code, or have another person (such as a co-worker) be at the instrument to obtain the access code.

Since pairing occurs in a pairing apparatus such as the cloud or a pairing server computer, the end user mobile device remains paired with the instrument no matter where the end user is located (even when the end user's mobile device is no longer in physical proximity to the instrument). Furthermore, a technical effect of the processes disclosed herein is that, because a new access code is generated each time an instrument is to be paired and that access code is only valid for a short, predetermined period of time, if a particular end user is unpaired by the instrument owner then that end user cannot use the old access code to re-pair because the old access code will not be recognized (it will not work). Instead, the end user is required to have physical access to the instrument, or communicate with a trusted party with physical access, to be able to re-pair with it. Furthermore, the pairing is revocable so that end users who should no longer have access to a particular instrument (for example, employees who no longer work with that instrument, or who have left the employment of that company) can be permanently removed from the system. Another technical effect is that, since pairing the end user device to the instrument is dynamic (because it happens at point of use by utilizing an instrument-generated access code instead of during manufacture or set up), there is no need for an administrator who needs to specify who can have access to this instrument. Thus, the only actors required are the end user, the instrument and the cloud. Yet further, another technical effect is that the novel pairing process does not require the instrument to have near-field communications (NFC) capabilities, such as being Bluetooth or Wi-FI enabled, because the pairing occurs through use of a pairing apparatus (such as a central server computer or the cloud). Thus, only an internet connection or other type of computer network communications connection is required.

In some embodiments, an end user runs a pairing application on his or her mobile device that generates a unique code for pairing purposes. The end user mobile device then transmits the unique pairing code to a remote server computer or to the cloud. In this implementation, the end user then physically enters the unique pairing code in an instrument to which he or she wishes to pair with the end user mobile device. If the end user is not located in physical proximity to the instrument, he or she may contact another person (such as a co-worker) to enter the unique pairing code into the instrument. At this point, the instrument transmits the unique pairing code to the remote server or to the cloud, which runs a pairing process similar to that explained above. Thus, in this embodiment, it is the end user mobile device which initiates the pairing process with the instrument (instead of the instrument initiating the pairing process), but the underlying method is the same. In particular, it is the remote server computer or the cloud which conducts the pairing of the instrument and the end user device as described herein.

Thus, the systems and processes disclosed herein thus provide end users with an easy to understand (or intuitive) and secure way to pair their mobile devices with specific instruments to obtain remote access to data from those instruments. Such systems and processes do not incur the overhead costs, monetary costs, and/or training time required by conventional pairing methods and systems that utilize a centralized system with an administrator. Instead, the present systems and processes enable end users to pair their user devices to instruments in a manner that can be handled by the end user alone (or with a co-worker, if the end user is in a location remote from the instrument) without requiring an administrator. In addition, the system and processes require only minimal overhead costs and minimal training time. Moreover, the systems and processes disclosed herein allow for an end user device to be permanently removed from the pairing if the instrument owner decides that is necessary.

The foregoing diagrams represent logical architectures for describing processes according to some embodiments, and actual implementations may include more or different components arranged in other manners. In addition, other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may include any number of hardware and/or software elements suitable to provide the functions described herein as well as any other functions. For example, any computing device used in an implementation of some embodiments may include a processor to execute program code such that the computing device operates as described herein.

All systems and processes discussed herein may be embodied in program code stored on one or more non-transitory computer-readable media. Such computer-readable media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Furthermore, the embodiments disclosed herein are set forth to aid in an understanding of the subject matter of this disclosure, but are not intended to, and should not be construed to limit in any way the claims appended hereto. Therefore, while specific terminology may have been employed for the sake of clarity in describing some exemplary embodiments, the present disclosure is not intended to be limited to the specific terminology so selected, and it is to be understood that each specific element includes all technical equivalents which operate in a similar manner.

Embodiments described herein and/or depicted in the figures are solely for the purpose of illustration. Thus, a person of ordinary skill in the relevant art may recognize other embodiments that may be practiced with various modifications and/or alterations to that described herein which are encompassed by the appended claims.

What is claimed is:

1. A computer-implemented method, comprising:
receiving a pairing request from an instrument including a unique access code;
receiving a pairing request from an end user mobile device comprising an end user mobile device identifier, end user identification data, and an access code;
determining that the unique access code from the instrument matches the access code from the end user mobile device;
transmitting a pairing confirmation message to the end user mobile device;
determining that the end user identification data is adequate;
transmitting a pairing confirmation message to the instrument deleting the unique access code; and
adding the end user mobile device identifier to a security group.

2. The computer-implemented method of claim 1, further comprising, subsequent to receiving the pairing request from the instrument:
determining that a predetermined time interval expired without receiving a pairing request from an end user mobile device concerning the instrument; and
transmitting a failure message to the instrument.

3. The computer-implemented method of claim 2, further comprising deleting the unique access code.

4. The computer-implemented method of claim 1, further comprising, subsequent to receiving the pairing request from the end user mobile device:
determining that the access code from the end user mobile device does not match the unique access code from the instrument; and
transmitting a failure message to the end user mobile device.

5. The computer-implemented method of claim 1,
further comprising, subsequent to determining that the unique access code from the instrument matches the access code from the end user mobile device:
transmitting a pairing confirmation message to the end user mobile device;
determining that the end user identification data is inadequate; and
transmitting a failure message to the end user device.

6. The computer-implemented method of claim 1, further comprising permitting the end user mobile device to at least one of monitor, assess, and remotely control the instrument.

7. A method comprising:
receiving, by a processor from an instrument, a pairing request including a unique access code;
receiving, by the processor from an end user mobile device, a pairing request comprising an access code, end user identification data, and a mobile device identifier;
determining, by the processor, that the unique access code matches the access code;
transmitting, by the processor, a pairing confirmation message to the end user mobile device;
determining, by the processor, that the end user identification data is adequate;
transmitting, by the processor, a pairing confirmation message to the instrument deleting, by the processor, the unique access code; and
adding, by the processor, the end user mobile device identifier to a security group.

8. The method of claim 7, further comprising, subsequent to receiving the pairing request from the instrument:
   determining, by the processor, that a predetermined time interval expired without receiving a pairing request from the end user mobile device concerning the instrument; and
   transmitting, by the processor to the instrument, a failure message.

9. The method of claim 8, further comprising deleting, by the processor, the unique access code.

10. The method of claim 7, further comprising, subsequent to receiving the pairing request from the end user mobile device:
   determining, by the processor, that the access code does not match the unique access code; and
   transmitting by the processor to the end user mobile device, a failure message.

11. The method of claim 7,
   further comprising, subsequent to determining that the unique access code from the instrument matches the access code from the end user mobile device:
   transmitting, by the processor to the end user mobile device, a pairing confirmation message;
   determining, by the processor, that the end user identification data is inadequate; and
   transmitting, by the processor to the end user device, a failure message.

12. The method of claim 7, further comprising permitting the end user mobile device to at least one of monitor, assess, and emotely control the instrument.

13. A non-transitory computer-readable medium storing instructions configured to cause a processor to:
   receive a pairing request including a unique access code from an instrument;
   receive a pairing request from an end user mobile device, the pairing request comprising an access code, end user identification data, and a mobile device identifier;
   determine that the unique access code matches the access code;
   transmit a pairing confirmation message to the end user mobile device;
   determine that the end user identification data is adequate;
   transmit a pairing confirmation message to the instrument;
   delete the unique access code; and
   add the end user mobile device identifier to a security group.

14. The non-transitory computer-readable medium of claim 13, further comprising instructions, subsequent to the instructions for receiving the pairing request from the instrument, configured to cause the processor to:
   determine that a predetermined time interval expired without receiving a pairing request from the end user mobile device concerning the instrument; and
   transmit a failure message to the instrument.

15. The non-transitory computer-readable medium of claim 14, further comprising instructions configured to cause the processor to delete the unique access code.

16. The non-transitory computer-readable medium of claim 13, further comprising, subsequent to the instructions for receiving the pairing request from the end user mobile device, instructions configured to cause the processor to:
   determine that the access code does not match the unique access code; and
   transmit a failure message to the end user mobile device.

17. The non-transitory computer-readable medium of claim 13, further comprising, subsequent to the instructions for determining that the unique access code from the instrument matches the access code from the end user mobile device, instructions configured to cause the processor to:
   transmit a pairing confirmation message to the end user mobile device;
   determine that the end user identification data is inadequate; and
   transmit a failure message to the end user device.

18. The non-transitory computer-readable medium of claim 13, further comprising instructions configured to cause a processor to permit the end user mobile device to at least one of monitor, assess, and remotely control the instrument.

19. A pairing apparatus, comprising:
   at least one processor;
   a communications device operably connected to the at least one processor; and
   a non-transitory storage device operably connected to the at least one processor, the non-transitory storage device storing program instructions configured to cause the at least one processor to:
   receive via the communications device a pairing request including a unique access code from an instrument;
   receive via the communications device a pairing request from an end user mobile device, the pairing request comprising an access code, end user identification data, and a mobile device identifier;
   determine that the unique access code matches the access code;
   transmit a pairing confirmation message to the end user mobile device;
   determine that the end user identification data is adequate;
   transmit a pairing confirmation message to the instrument;
   delete the unique access code; and
   add the end user mobile device identifier to a security group.

20. The pairing apparatus of claim 19, wherein, subsequent to the instructions for receiving the pairing request from the instrument, the at least one processor is further operative with the program instructions to:
   determine that a predetermined time interval expired without receiving a pairing request from the end user mobile device concerning the instrument; and
   transmit via the communications device a failure message to the instrument.

21. The pairing apparatus of claim 20, wherein the at least one processor is further operative with the program instructions to delete the unique access code.

22. The pairing apparatus of claim 20, wherein the at least one processor is further operative with the program instructions to permit the end user mobile device to at least one of monitor, assess, and remotely control the instrument.

23. The pairing apparatus of claim 19, wherein the at least one processor, communications device and the non-transitory computer readable medium comprise one of a remote server computer or a server computer associated with a cloud system.

* * * * *